United States Patent
Lin et al.

(10) Patent No.: US 12,131,517 B1
(45) Date of Patent: Oct. 29, 2024

(54) MULTI-SOURCE IMAGE CORRESPONDENCE METHOD AND SYSTEM BASED ON HETEROGENEOUS MODEL FITTING

(71) Applicant: JINAN UNIVERSITY, Guangzhou (CN)

(72) Inventors: Shuyuan Lin, Guangzhou (CN); Jian Weng, Guangzhou (CN); Feiran Huang, Guangzhou (CN)

(73) Assignee: JINAN UNIVERSITY, Guangzhou (CN)

( * ) Notice: Subject to any disclaimer, the term of this patent is extended or adjusted under 35 U.S.C. 154(b) by 0 days.

(21) Appl. No.: 18/674,036

(22) Filed: May 24, 2024

(30) Foreign Application Priority Data

Aug. 18, 2023 (CN) .......................... 202311050564.1

(51) Int. Cl.
| | |
|---|---|
| G06V 10/75 | (2022.01) |
| G06T 7/73 | (2017.01) |
| G06V 10/44 | (2022.01) |
| G06V 10/50 | (2022.01) |

(52) U.S. Cl.
CPC ............... G06V 10/751 (2022.01); G06T 7/75 (2017.01); G06V 10/449 (2022.01); G06V 10/50 (2022.01); G06V 10/753 (2022.01)

(58) Field of Classification Search
CPC .. G06V 10/751; G06V 10/753; G06V 10/449; G06V 10/50; G06T 7/75
See application file for complete search history.

(56) References Cited

U.S. PATENT DOCUMENTS

| 8,582,889 B2 * | 11/2013 | Vaddadi | ............... G06V 10/462 |
| | | | 382/168 |
| 2005/0238198 A1 * | 10/2005 | Brown | ............... G06V 10/7515 |
| | | | 382/103 |

FOREIGN PATENT DOCUMENTS

| CN | 109523585 A | * | 3/2019 | ............... G06T 7/33 |
| CN | 111126508 A | * | 5/2020 | |
| CN | 111292336 A | * | 6/2020 | ............... G06T 5/40 |

(Continued)

*Primary Examiner* — Ian L Lemieux
(74) *Attorney, Agent, or Firm* — Jeenam Park

(57) ABSTRACT

A multi-source image correspondence method and system based on heterogeneous model fitting is provided, the method includes the following steps: constructing a multi-orientation phase consistency model, fusing phase consistency, image amplitude, and orientation detection feature points, constructing logarithmic polar coordinate descriptors with variable-size bins using sub-region grids and orientation histograms, effectively estimating model parameters through heterogeneous model fitting, accumulating matching pairs from different heterogeneous models that meet a preset joint position offset transformation error, outputting a final matching pair, and completing multi-source image correspondence. The present disclosure alleviate the influence of nonlinear radiation distortion by constructing the multi-orientation phase consistency model, constructing logarithmic polar coordinate descriptors with variable-size bins by sub-region grids and orientation histograms, removing an abnormal matching relationship in multi-source images with the heterogeneous model fitting method, thereby improving the accuracy and robustness of feature detection and improving multi-source image correspondence performance.

6 Claims, 4 Drawing Sheets

(56) References Cited

FOREIGN PATENT DOCUMENTS

| CN | 113409369 A | * | 9/2021 | |
|---|---|---|---|---|
| CN | 115601569 A | * | 1/2023 | |
| CN | 113256653 B | * | 5/2023 | ........... G06T 3/0075 |

* cited by examiner

MULTI-SOURCE IMAGE CORRESPONDENCE METHOD AND SYSTEM BASED ON HETEROGENEOUS MODEL FITTING

CROSS-REFERENCE TO RELATED APPLICATIONS

This application claims priority to Chinese Patent Application No. 202311050564.1, filed on Aug. 18, 2023, which is hereby incorporated by reference in its entirety.

TECHNICAL FIELD

The present disclosure relates to the field of image processing technologies, and in particular, to a multi-source image correspondence method and system based on heterogeneous model fitting.

BACKGROUND

Multi-source image correspondence (i.e., image-matching) is a process of establishing a correspondence between two or more images with overlapping regions captured by different time phases, viewing angles, or different modal sensors (Multi-source image correspondence is often influenced by sensor type, rotation, noise, blurring, or temporal changes, which results in a large number of outliers and incorrect correspondences, which poses great challenges to multi-source image correspondence.

For the problem of multi-source image correspondence, Scale Invariant Feature Transform (SIFT) is a classic feature extraction method that is robust to scale, rotation, and linear intensity variations, but highly sensitive to linear intensity variations. Some improved SIFT variants (such as Uniform Robust SIFT and Scale Constrained SURF) solve this problem by improving local features. However, due to significant differences in intensity and texture in multi-source images, features extracted from multi-source images usually have low local repeatability. Therefore, these methods are only suitable for specific types of images, and their application scope is limited.

SUMMARY

In order to overcome the shortcomings and deficiencies of existing technologies, the present disclosure provides a multi-source image correspondence method based on heterogeneous model fitting. By constructing a multi-orientation phase consistency model, the influence of nonlinear radiation distortion is alleviated. A logarithmic polar coordinate descriptor with variable-size bins is constructed using sub-region grids and orientation histograms, an abnormal matching relationship in multi-source images is removed with the heterogeneous model fitting method and a final matching relationship is outputted, thereby improving the accuracy and robustness of feature detection and improving multi-source image correspondence performance.

In order to achieve the above objectives, the present disclosure adopts the following technical solutions.

The present disclosure provides a multi-source image correspondence method based on heterogeneous model fitting, including the following steps:

obtaining a two-dimensional image, constructing a two-dimensional log-Gabor filter for the two-dimensional image;

converting the two-dimensional log-Gabor filter from a frequency domain to a spatial domain based on Fourier inverse transform;

calculating an amplitude component and a phase component with respect to the scale and orientation;

constructing a phase consistency model based on the amplitude component and phase component, calculating phase consistency weighted moments in multiple orientations, and constructing a multi-orientation phase consistency model based on phase consistency model and phase consistency weighted moments in multiple orientations;

extracting image feature information from the multi-orientation phase consistency model by using Shi-Tomasi operator, filtering out a feature point with a response value below a set threshold, constructing a variable-size bin strategy based on image feature information, the variable-size bin strategy divides a circular neighborhood of feature distribution into a plurality of sub-regions with different numbers according to different angular quantization rules, and different circular neighborhoods use gradient orientation histograms with different dimensions as a local descriptor;

calculating the orientational histogram of each sub-region as a descriptor, defining a quantified orientation histogram for each feature point as a descriptor, and normalizing a descriptor vector;

taking the two-dimensional image as a reference image, obtaining a to-be-matched target image, constructing an optimal geometric transformation model, and minimizing feature information between the reference image and the target image;

obtaining coordinates of two feature points from the reference image and the target image respectively, and constructing an initial matching pair;

generating multiple model hypotheses for every two images based on the heterogeneous model, the model hypotheses are generated by randomly sampling multiple minimum subsets from feature points in the model hypotheses;

calculating a transformation error of any two feature points in the reference image and target image with respect to the model hypotheses with Sampson distance, forming an ascending permutation, selecting the least k-th-order statistic of a square transformation error as a minimum cost, k represents an acceptable size of a structure;

extracting more matching pairs by combining horizontal displacement, vertical displacement, and cosine similarity of descriptor vector as a constraint criterion, calculating the offset of matching pairs in horizontal and vertical orientations as a position transformation error constraint feature descriptor, and constructing a joint position offset transformation error;

accumulating matching pairs from different heterogeneous models that meet a preset joint position offset transformation error; retaining only one matching pair when two matching pairs have the same feature points; outputting a final matching pair to complete multi-source image correspondence after an accumulation operation.

In some embodiments, constructing a two-dimensional log-Gabor filter for the two-dimensional image is represented specifically as:

$$G_{(\sigma,\mu)}(\rho, \delta) = \exp\left(\frac{(\rho - \rho_\sigma)^2}{-2B_\rho^2}\right) \cdot \exp\left(\frac{(\delta - \delta_{(\sigma,\mu)})^2}{-2B_\delta^2}\right)$$

where, $B_\rho$ and $B_\delta$ respectively represent bandwidths of the filter in the orientation of pole diameter $\rho$ and polar angle $\delta$, $\sigma$ and $\mu$ represent scale and orientation of the two-dimensional log-Gabor filter G, $\rho_\sigma$ represents a center frequency of the filter, $\delta(\sigma,\mu)$ represents angular frequency in a polar coordinate.

In some embodiments, converting the two-dimensional log-Gabor filter from a frequency domain to a spatial domain based on Fourier inverse transform is represented as:

$$G_{(\sigma,\mu)}(x, y) = G_{(\sigma,\mu)}^{eve}(\rho, \delta) + i \cdot G_{(\sigma,\mu)}^{odd}(\rho, \delta)$$

where, $$G_{(\sigma,\mu)}^{eve}(x, y)$$

and $$G_{(\sigma,\mu)}^{odd}(x, y)$$

represent even-symmetric and odd-symmetric of the two-dimensional log-Gabor filter G, respectively; i represent the imaginary unit.

In some embodiments, constructing a multi-orientation phase consistency model based on phase consistency model and phase consistency weighted moments in multiple orientations is represented as:

$$W_\sigma = 0.5 \times (M_\sigma + M_\sigma + \varpi \times (M_\sigma - M_\sigma))$$

$$\begin{cases} M_\sigma = \frac{1}{2}\left(\sum_\mu (\beta_\sigma)^2 + \sum_\mu (\alpha_\sigma)^2 + \sqrt{\left(2\sum_\mu (\alpha_\sigma)(\beta_\sigma)\right)^2 + \left(\sum_\mu (\alpha_\sigma)^2 - \sum_\mu (\beta_\sigma)^2\right)^2}\right), \\ M_\sigma = \frac{1}{2}\left(\sum_\mu (\beta_\sigma)^2 + \sum_\mu (\alpha_\sigma)^2 - \sqrt{\left(2\sum_\mu (\alpha_\sigma)(\beta_\sigma)\right)^2 + \left(\sum_\mu (\alpha_\sigma)^2 - \sum_\mu (\beta_\sigma)^2\right)^2}\right), \end{cases}$$

$$\alpha_\sigma = PC(x, y) \cdot \cos(\phi_{(\sigma,\mu)})$$

$$\beta_\sigma = PC(x, y) \cdot \sin(\phi_{(\sigma,\mu)})$$

$$PC(x, y) = \frac{\sum_\sigma \sum_\mu \omega_\sigma(x, y) \lfloor A_{(\sigma,\mu)}(x, y) \Delta P_{(\sigma,\mu)}(x, y) - \gamma \rfloor}{\sum_\sigma \sum_\mu A_{(\sigma,\mu)}(x, y) + \partial}$$

$$\begin{cases} A_{(\sigma,\mu)}(x, y) = \left(E_{(\sigma,\mu)}(x, y)^2 + O_{(\sigma,\mu)}(x, y)^2\right)^{0.5} \\ P_{(\sigma,\mu)}(x, y) = \arctan\left(O_{(\sigma,\mu)}(x, y)/E_{(\sigma,\mu)}(x, y)\right), \end{cases}$$

$$E_{(\sigma,\mu)}(x, y) = I(x, y) * G_{(\sigma,\mu)}^{eve}(x, y)$$

$$O_{(\sigma,\mu)}(x, y) = I(x, y) * G_{(\sigma,\mu)}^{odd}(x, y)$$

where, $A_{(\sigma,\mu)}(x,y)$ represents the amplitude component, $P_{(\sigma,\mu)}(x,y)$ represents the phase component, $\omega_\sigma(x,y)$ is a weight coefficient, $\lfloor \cdot \rfloor$ is a truncation function, $\Delta P_{(\sigma,\mu)}(x,y)$ is phase deviation with respect to the scale $\sigma$ and orientation $\mu$; $\gamma$ and $\partial$ are constant; $M_\sigma$ and $M_\sigma$ represent a maximum moment and a minimum moment corresponding to the scale $\sigma$; $\overline{\omega}$ represent a weighted moment coefficient of orientation, PC represent the phase consistency model; $W_\sigma$ represent the multi-orientation phase consistency model, $I(x,y)$ represent the two-dimensional image, $G_{(\sigma,\mu)}^{eve}(x,y)$ and $G_{(\sigma,\mu)}^{odd}(x,y)$ represent the even-symmetric and odd-symmetric of the two-dimensional log-Gabor filter G, respectively.

In some embodiments, calculating the orientational histogram of each sub-region as a descriptor and defining a quantified orientation histogram for each feature point as a descriptor are represented as:

$$\mathcal{D}_d = \{\mathcal{R}_{(1,1)} \cdot \mathcal{H}_{(1,1)}, \ldots, \mathcal{R}_{(h,l)} \cdot \mathcal{H}_{(h,q)}, \ldots, \mathcal{R}_{(n,k)} \cdot \mathcal{H}_{(n,m)}\}, \forall h \in \{1, \ldots, n\}, \forall q \in \{1, \ldots, m\}, \forall l \in \{1, \ldots, k\}$$

where, R(h,t) represents a sub-region of a $q^{th}$ radial quantization and $i^{th}$ angular quantization; $\mathcal{H}(h,q)$ represents an orientation histogram that is quantized of the $q^{th}$ histogram in $h^{th}$ radial quantization; n is the amount of radial quantization; m is the number of histogram quantization; $\kappa$ is the number of angular quantization; dimension of each descriptor is described as $d=\Sigma_{h=1}^n m_h \cdot k_h$.

In some embodiments, the calculating a transformation error of any two feature points in the reference image and target image with respect to the model hypotheses with Sampson distance and forming an ascending permutation are represented as:

$$\lambda_i^{(v)} = [\lambda_{i,1}^{(v)}, \lambda_{i,2}^{(v)}, \ldots, \lambda_{i,M}^{(v)}]$$

which satisfies $\tau_{\theta_i}^{(v)}, \lambda_{i,1}^{(v)} \leq \ldots \leq \tau_{\theta_i}^{(v)}, \lambda_{i,M}^{(v)}$, $\lambda_i^{(v)}$ represents preference of feature points with respect to each model type, $\tau_{\theta_i}^{(v)}$ represents the transformation error of any two feature points $(s_i, s'_i)$ with respect to the model hypotheses $\theta_i^{(v)}$, $s_i$ and $s'_i$ respectively represent coordinates of two feature points from the reference image and the target image.

In some embodiments, selecting the least k-th-order statistic of a square transformation error as a minimum cost is represented as:

$$C(\theta^{(v)}) = \sum_{j=k-p+1}^{k} \lambda_j^{2(v)}$$

where, $\lambda_j^{2(v)}$ denotes a $j^{th}$ sorted squared transformation error, and p represents the size of multiple minimum subsets that is randomly sampled.

In some embodiments, a constructed joint position offset transformation error is represented as:

$$J^{(v)}(s_i, s'_j) = (1 + E^{(v)}(s_i, s'_j)) \cdot D(s_i, s'_j)$$

where, $s_i$ and $s'_j$ represent feature points in two heterogeneous images, respectively; subscripts i and j represent indexes of feature points in the image, $D(s_i, s'_j)$ denotes inverse cosine similarity of descriptors corresponding to $s_i$ and $s'_j$, $E^{(v)}(s_i, s'_j) = \|s_i - \tau_{\theta_i}^{(v)}(s_i, s'_j)\|$ represent a positional transformation error between matching pair $(s_i, s'_j)$, and $\tau_{\theta_i}^{(v)}$ represent the transformation error of any two feature points $(s_i, s'_i)$ with respect to the model hypotheses.

In some embodiments, the accumulating matching pairs from different heterogeneous models with a small joint position offset transformation error is represented as:

$$S^* = F\left(\sum_{v \in V} \tilde{S}^{(v)}\right)$$

where, F(·) denotes removing duplicates by traversing all candidate matching pairs, $\tilde{S}^{(v)}$ represents a candidate matching pair defined by the joint position offset transformation error, $$\sum_{v \in V}$$

represents an accumulating operation performed on each heterogeneous model, and V represents the heterogeneous model.

The present disclosure further provides a multi-source image correspondence system based on heterogeneous model fitting, including:

an image acquisition module, a log-Gabor filter construction module, a frequency domain conversion module, a multi-orientation phase consistency model construction module, an image feature information extraction module, a variable-size bin strategy construction module, a descriptor construction module, a normalization module, a target image acquisition module, an optimal geometric transformation model construction module, an initial matching pair construction module, a model hypothesis generation module, a minimum cost calculation module, a joint position offset transformation error construction module, and a matching output module;

the image acquisition module is configured to obtain a two-dimensional image;

the log-Gabor filter construction module is configured to construct a two-dimensional log-Gabor filter for the two-dimensional image;

the frequency domain conversion module is configured to transform the two-dimensional log-Gabor filter from a frequency domain to a spatial domain based on a Fourier inverse transform;

the multi-orientation phase consistency model construction module is configured to construct a multi-orientation phase consistency model, calculate an amplitude component and a phase component with respect to the scale and orientation, construct a phase consistency model based on the amplitude component and phase component, calculate phase consistency weighted moments in multiple orientations, and construct a multi-orientation phase consistency model based on phase consistency model and phase consistency weighted moments in multiple orientations;

the image feature information extraction module is configured to extract image feature information from the multi-orientation phase consistency model by using the Shi-Tomasi operator, filter out a feature point with a response value below a set threshold;

the variable-size bin strategy construction module is configured to construct a variable-size bin strategy based on image feature information, the variable-size bin strategy divides a circular neighborhood of feature distribution into a plurality of sub-regions with different numbers according to different angle quantization rules, and different circular neighborhoods use gradient orientation histograms with different dimensions as a local descriptor;

the descriptor construction module is configured to calculate the orientation histogram of each sub-region as a descriptor, define a quantified orientation histogram for each feature point as a descriptor, and normalize a descriptor vector;

the normalization module is configured to normalize a descriptor vector;

the target image acquisition module is configured to take the two-dimensional image as a reference image to obtain a to-be-matched target image;

the optimal geometric transformation model construction module is configured to construct an optimal geometric transformation model, minimize feature information between the reference image and the target image;

the initial matching construction module is configured to obtain coordinates of two feature points from the reference image and the target image, respectively; and construct an initial matching pair;

the model hypotheses generation module is configured to generate multiple model hypotheses for every two images based on the heterogeneous model, the model hypotheses are generated by randomly sampling multiple minimum subsets from feature points in the model hypotheses;

the minimum cost calculation module is configured to calculate a transformation error of any two feature points in the reference image and target image with respect to the model hypotheses using Sampson distance, form an ascending permutation, select the least k-th-order statistic of a square transformation error as a minimum cost, k represents an acceptable size of a structure;

the joint position offset transformation error construction module is configured to construct a joint position offset transformation error, which combines horizontal displacement, vertical displacement, and cosine similarity of descriptor vectors as a constraint criteria to extract more matching pairs; calculate offset of matching pairs in horizontal and vertical orientations as a position transformation error constraint feature descriptor, and construct a joint position offset transformation error;

the matching output module is configured to accumulate matching pairs from different heterogeneous models that meet a preset joint position offset transformation error; retain only one matching pair when two matching pairs have the same feature points, output a final matching pair to complete multi-source image correspondence after an accumulation operation.

Compared with prior art, the present disclosure has the following advantages and beneficial effects:

(1) The present disclosure constructs a multi-orientation phase consistency model to alleviate the influence of non-linear radiation distortion, sub-region grids and orientation histograms are used to construct logarithmic polar coordinate descriptors with variable-size bins, and the heterogeneous model fitting method is used to remove abnormal matching relationships in multi-source images, thereby improving the accuracy and robustness of feature detection.

(2) The present disclosure adopts a robust heterogeneous model fitting technique, which solves the technical problem of the influence of the limitation of a single basic transformation model on the performance of image correspondence in multi-source image correspondence. It effectively fuses different types of basic models, thereby improving the performance of multi-source image correspondence.

DESCRIPTION OF EMBODIMENTS

In order to make the purpose, technical solution, and advantages of the present disclosure clearer and untestable, the following will provide further detailed explanations of the present disclosure in combination with the accompanying drawings and embodiments. It should be understood that the specific embodiments described here are only intended to explain the present disclosure and are not intended to limit the present disclosure.

Embodiment 1

Figure 1:
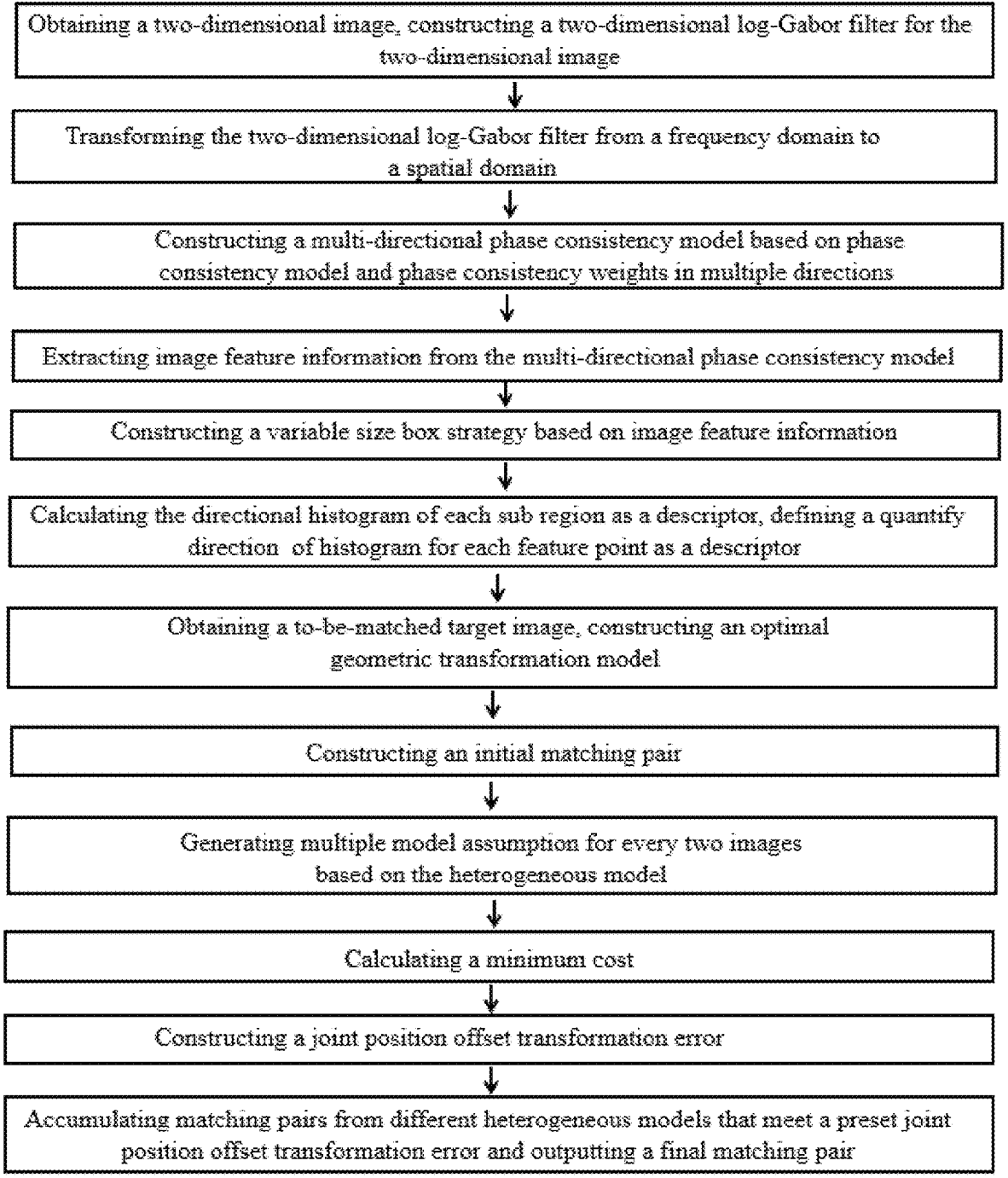
FIG. 1 is a flowchart of a multi-source image correspondence method based on heterogeneous model fitting of the present disclosure.

As shown in FIG. 1, this embodiment provides a multi-source image correspondence method based on heterogeneous model fitting, including the following steps:

S1: Preparing a set of initial matching coordinates S, a heterogeneous model V, model hypotheses with a number of M, and an acceptable size of a structure with a number of k;

S2: Constructing a multi-orientation phase consistency model, fusing phase consistency, image amplitude, and orientation detection feature point;

In this embodiment, the multi-orientation phase consistency model is constructed for multi-orientation feature detection, and which includes specific steps:

S21: Giving a two-dimensional image I(x,y), a two-dimensional log-Gabor filter G for the image can be represented as:

$$G_{(\sigma,\mu)}(\rho, \delta) = \exp\left(\frac{(\rho - \rho_\sigma)^2}{-2B_\rho^2}\right) \cdot \exp\left(\frac{(\delta - \delta_{(\sigma,\mu)})^2}{-2B_\delta^2}\right) \quad \text{(Formula 1)}$$

where, $B_\rho$ and $B_\delta$ indicate bandwidths of the filter in orientation of pole diameter $\rho$ and polar angle $\delta$, the bandwidth refers to a range of the filter in frequency and orientation, which determines a response degree of the filter to different frequencies or orientations; $\sigma$ and $\mu$ represent scale and orientation of the two-dimensional log-Gabor filter G, $\rho_\sigma$ represents a center frequency of the filter, $\delta_{(\sigma,\mu)}$ represents angular frequency in a polar coordinate;

S22: converting the two-dimensional log-Gabor filter G from a frequency domain to a spatial domain based on Fourier inverse transform, and it is represented as:

$$G_{(\sigma,\mu)}(x, y) = G_{(\sigma,\mu)}^{eve}(\rho, \delta) + i \cdot G_{(\sigma,\mu)}^{odd}(\rho, \delta), \quad \text{(Formula 2)}$$

where, $$G_{(\sigma,\mu)}^{eve}(x, y)$$

and $$G_{(\sigma,\mu)}^{odd}(x, y)$$

represent even-symmetric and odd-symmetric of the two-dimensional log-Gabor filter, respectively; i represent imaginary unit;

S23: calculating an amplitude component $A_{(\sigma,\mu)}(x,y)$ and a phase component $P_{(\sigma,\mu)}(x,y)$ with respect to the scale $\sigma$ and orientation $\mu$:

$$\begin{cases} A_{(\sigma,\mu)}(x, y) = \left(E_{(\sigma,\mu)}(x, y)^2 + O_{(\sigma,\mu)}(x, y)^2\right)^{0.5} \\ P_{(\sigma,\mu)}(x, y) = \arctan(O_{(\sigma,\mu)}(x, y)/E_{(\sigma,\mu)}(x, y)), \end{cases} \quad \text{(Formula 3)}$$

where, $E_{(\sigma,\mu)}(x,y) = I(x,y) * G_{(\sigma,\mu)}^{eve}(x,y)$, $O_{(\sigma,\mu)}(x,y) = I(x,y) * G_{(\sigma,\mu)}^{odd}(x,y)$ represents a log-Gabor response obtained by performing convolution operation at scale $\sigma$ and orientation $\mu$.

S24: Constructing a phase consistency (PC) model based on the amplitude component $A_{(\sigma,\mu)}(x,y)$ and phase component $P_{(\sigma,\mu)}(x,y)$, $$PC(x, y) = \frac{\sum_\sigma \sum_\mu \omega_\sigma(x, y) \lfloor A_{(\sigma,\mu)}(x, y) \Delta P_{(\sigma,\mu)}(x, y) - \gamma \rfloor}{\sum_\sigma \sum_\mu A_{(\sigma,\mu)}(x, y) + \grave{o}} \quad \text{(Formula 4)}$$

where, $\omega_\sigma(x,y)$ is a weight coefficient, $\lfloor \cdot \rfloor$ is a truncation function, it is used to truncate a real number to an integer, which can effectively alleviate the influence of nonlinear radiative distortions (NRDs); $A_{(\sigma,\mu)}(x,y)$ is the amplitude component; $\Delta P_{(\sigma,\mu)}(x,y)$ denotes a phase deviation with respect to the scale $\sigma$ and orientation $\mu$; $\gamma$ and $\grave{o}$ are constant so as to avoid the denominator being 0.

S25: Calculating phase consistency weighted moments for multiple orientations so as to enhance robustness;

$$\begin{cases} M_\sigma = \frac{1}{2}\left(\sum_\mu (\beta_\sigma)^2 + \sum_\mu (\alpha_\sigma)^2 + \sqrt{\left(2\sum_\mu (\alpha_\sigma)(\beta_\sigma)\right)^2 + \left(\sum_\mu (\alpha_\sigma)^2 - \sum_\mu (\beta_\sigma)^2\right)^2}\right), \\ M_\sigma = \frac{1}{2}\left(\sum_\mu (\beta_\sigma)^2 + \sum_\mu (\alpha_\sigma)^2 - \sqrt{\left(2\sum_\mu (\alpha_\sigma)(\beta_\sigma)\right)^2 + \left(\sum_\mu (\alpha_\sigma)^2 - \sum_\mu (\beta_\sigma)^2\right)^2}\right), \end{cases} \quad \text{(Formula 5)}$$

where, $M_\sigma$ and $M_\sigma$ represent a maximum moment and a minimum moment corresponding to the scale $\sigma$; $\alpha_\sigma = PC(x,y) \cdot \cos(\phi_{(\sigma,\mu)})$, $\beta_\sigma = PC(x,y) \cdot \sin(\phi_{(\sigma,\mu)})$ and $(\phi_{(\sigma,\mu)})$, represent the angular of orientation $\mu$ at scale $\sigma$.

S26: Constructing a multi-orientation phase consistency model based on phase consistency model $W_\sigma$ and multi-orientation weighted moments to alleviate the influence of nonlinear radiative distortions (NRDs):

$$W_\sigma = 0.5 \times (M_\sigma + M_\sigma + \overline{\omega} \times (M_\sigma - M_\sigma)) \quad \text{(Formula 6)}$$

where, $\overline{\omega}$ represent a weight coefficient of orientation.

S27: Extracting a feature point from the multi-orientation phase consistency model $W_\sigma$ by using the Shi-Tomasi operator, filtering out a feature point with a response value below a set threshold; Specifically, the Shi-Tomasi operator first calculates a structural tensor of each pixel in the multi-orientation phase consistency model $W_\sigma$ to obtain a minimum feature value of each pixel. Then, based on the set threshold, the pixel with a larger minimum feature value is selected as a corner point, the feature information represents prominent features in the image, such as corners and edges. The extracted feature information will participate in a subsequent descriptor construction.

Figure 2:
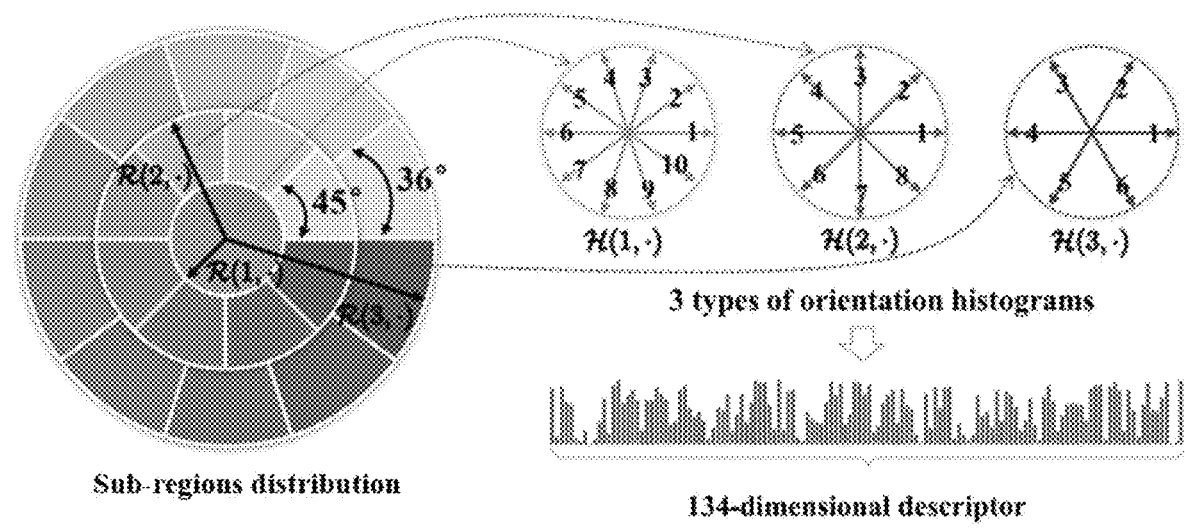
FIG. 2 is a schematic diagram of a variable-size bin strategy of an embodiment of the present disclosure.

S3: Constructing a logarithmic polar coordinate descriptor with variable-size bins using sub-region grids and orientation histograms, this descriptor is robust to geometric distortion;

this embodiment constructs the logarithmic polar coordinate descriptor with variable-size bins, which can improve the ability of the descriptor to distinguish a local geometric distortion and establish a high-quality initial correspondence, and it includes the following steps:

S31: As shown in FIG. 2, a variable-size bin strategy is constructed based on feature position information extracted by the Shi-Tomasi operator, as the contribution of a central region to the feature description is usually greater than that of a surrounding region. Therefore, unlike traditional methods where each circular-shape uses the same number of sub-regions, this strategy divides the circular neighborhood into a plurality of sub-regions with different numbers according to different angle quantization rules, and different circular neighborhoods use gradient orientation histograms with different dimensions as a local descriptor to adapt to different feature distributions, thereby improving the stability and robustness of the descriptor.

S32: Calculating an orientational histogram of each sub-region as a descriptor and defining a quantified orientation histogram for each feature point as a descriptor, and it is represented as:

$$\mathcal{D}_d = \{ \mathcal{R}_{(1,1)} \cdot \mathcal{H}_{(1,1)}, \ldots, \mathcal{R}_{(h,l)} \cdot \mathcal{H}_{(h,q)}, \ldots, \mathcal{R}_{(n,k)} \cdot \mathcal{H}_{(n,m)} \}, \forall h \in \{1, \ldots, n\}, \forall q \in \{1, \ldots, m\}, \forall l \in \{1, \ldots, k\} \quad \text{(Formula 7)}$$

where, R(h,t) represents a sub-region of a $q^{th}$ radial quantization and $i^{th}$ angular quantization; $\mathcal{H}(h,q)$ represents an orientation histogram that is quantized of the $q^{th}$ histogram in $h^{th}$ radial quantization; n denotes the amount of radial quantization; m is the number of histogram quantization; κ is the number of angular quantization; thus, the dimension of each descriptor can be described as $d = \sum_{h=1}^{n} m_k \cdot k_h$.

S33: Normalizing a descriptor vector to reduce the influence of illumination variations. A normalized descriptor vector can be used in a subsequent matching process to calculate and evaluate a similarity between image pairs and obtain a determined initial matching pair.

S4: Effectively estimating a parameter of the model by fitting the heterogeneous model and fusing advantages of various basic transformation models so as to effectively estimate the parameter of the model and alleviate the influence of an outlier; the specific steps include:

S41: giving a two-dimensional image (i.e., a reference image) I(x,y) and another image that needs to be matched (a target image) I'(x,y), a goal of this step is to find an optimal geometric transformation model $\hat{f}(x,y)$ so as to minimize the feature information (such as distance) between the reference image I(x,y) and the transformed target image I'(f(x,y)):

$$\hat{f}(x,y) = \mathrm{argmin}[\Phi(I(x,y), I'(f(x,y)))] \quad \text{(Formula 8)}$$

where, f(x,y), I'(f(x,y)), and Φ are the geometric transformation model, a transformed target image, and a distance metric; $\hat{f}(x,y)$ represents the optimal geometric transformation model and which refers to a geometric transformation model that can minimize the feature information distance. For example, feature point pairs between two images can be used to estimate an affine transformation matrix (also known as an affine transformation model). If there are enough feature points can be found to support the affine transformation model (i.e. minimizing the distance between the feature point and the model), then the current geometric transformation is considered an optimal geometric transformation model (i.e. the optimal geometric transformation model). In addition, due to factors such as deformation in images, accurate matching between the two images requires compliance with the constraints of geometric transformation models.

S42: Giving a set of initial matching pairs $S = \{(s_i, s'_i)\}_{i=1}^{N}$ where N is the number of matching pairs, $s_i = (x_i, y_i)$ and $s'_i = (x_i, y_i)$ represents the coordinates of two feature points from the reference image and the target image, respectively.

S43: Generating a model hypothesis $\theta^{(v)} = \{\theta_i^{(v)}\}_{i=1:M}$ for every two images and for each type of model $v \in V$, where, $v \in V$ represents the heterogeneous model (i.e., a collection of different types of models, including a similarity transformation model, an affine transformation model, and a perspective transformation model). These model hypotheses are generated by randomly sampling a minimum subset p from feature points.

S4: Calculating a transformation error $\tau_{\theta_i^{(v)}}(s_i, s'_i)$ of any two feature points $(s_i, s'_i)$ in the reference image and target image with respect to the model hypotheses $\theta_i^{(v)}$ with Sampson distance, forming an ascending permutation:

$$\lambda_i^{(v)} = [\lambda_{i,1}^{(v)}, \lambda_{i,2}^{(v)}, \ldots, \lambda_{i,M}^{(v)}] \quad \text{(Formula 9)}$$

which satisfies $\tau_{\theta_i^{(v)}} \lambda_{i,1}^{(v)} \leq \ldots \leq \tau_{\theta_i^{(v)}} \lambda_{i,M}^{(v)}$, $\lambda_i^{(v)}$ represents the preference of feature points with respect to each model type, its value is small if the feature point belongs to the inlier of a transformation model, and vice versa.

S45: Introducing a modified cost function to select the least k-th-order statistic of a square transformation error as a minimum cost:

$$C(\theta^{(v)}) = \sum_{j=k-p+1}^{k} \lambda_j^{2(v)} \quad \text{(Formula 10)}$$

where, $\lambda_j^{2(v)}$ denotes a $j^{th}$ sorted squared transformation error, and k represents an acceptable size of a structure, which is greater than the size of a minimum subset (k≫p).

S46: Effectively quantified the significant transformation model as the minimum cost of the k-th-order statistic with the above cost function and then combined with horizontal, vertical displacement and cosine similarity of descriptor vectors as a constraint criterion to extract more correct matching pairs.

S47: Evaluating the quality of model hypotheses that are generated by random sampling through minimizing the k-th-order statistic of a square transformation error by a significant transformation model. Based on the significant transformation model, a small number of reliable feature matching pairs can be obtained. However, significant models typically only contain a small number of reliable feature matching pairs. Therefore, it is necessary to calculate offsets of these matching pairs in the horizontal and vertical orientations as position transformation errors to constrain the feature descriptors. Specifically, their offsets in the horizontal and vertical orientations can be obtained by calculating the Euclidean distance between the matching pairs. Then, these offsets are used as position transformation errors to constrain the feature descriptors. Finally, a joint position offset transformation error $J^{(v)}(s_i,s'_j)$ is defined as:

$$J^{(v)}(s_i,s'_j)=(1+E^{(v)}(s_i,s'_j)) \cdot D(s_i,s'_j) \quad \text{(Formula 11)}$$

where, $s_i$ and $s'_j$ represent feature points in two heterogeneous images, respectively. The subscripts i and j are used to represent indexes of feature points in the image, $D(s_i,s'_j)$ denotes inverse cosine similarity of descriptors corresponding $s_i$ and $s'_j$, and $E^{(v)}(s_i,s'_j)=\|s_i-\tau_{\theta_i}^{(v)}(s_i,s'_j)\|$ represents positional transformation error between matching pairs $(s_i,s'_j)$. It is necessary to traverse all possible matching pairs and calculate their similarity to determine which matching pairs are correct. When the joint position offset transformation error is less than a certain threshold, feature points $s_i$ and $s'_j$ are considered the candidate matching pairs $\tilde{S}^{(v)}$.

S48: Accumulating matching pairs with smaller joint position offset transformation error from different models (i.e. similarity model, affine model, perspective model, etc.).

$$S^* = F\left(\sum_{v \in V} \tilde{S}^{(v)}\right) \quad \text{(Formula 12)}$$

where, $F(\cdot)$ represents removing duplicates by traversing all candidate matching pairs, if two matching pairs have the same feature points, only one matching pair is retained; $\tilde{S}^{(v)}$ represents a candidate matching pair defined by joint position offset transformation error, $$\sum_{v \in V}$$

represents an accumulating operation performed on each heterogeneous model.

S5: Outputting a final matching pair S*.

Figure 3:
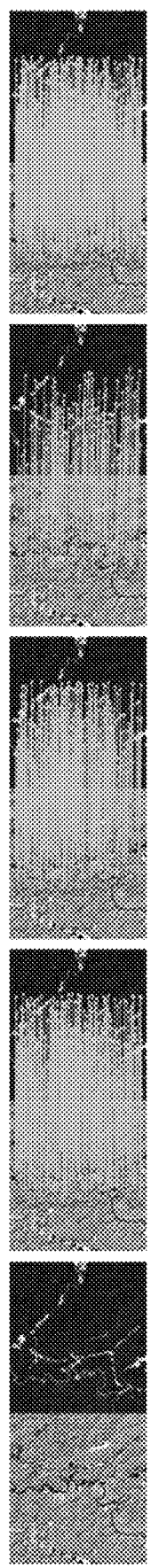
FIG. 3 is a comparison diagram of matching results between the present disclosure and a similar model, an affine model, and a perspective model on the TENM-DS dataset.
Figure 4A:
FIG. 4A is a schematic diagram of the present disclosure establishing a corresponding matching relationship between an optical image and a depth image.
Figure 4B:
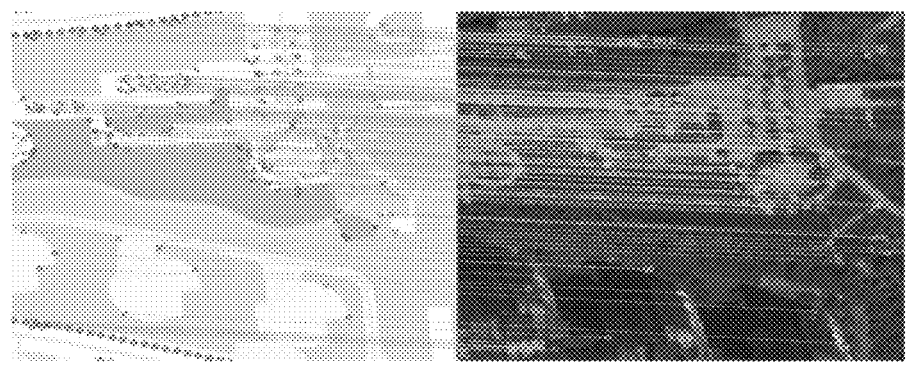
FIG. 4B is a schematic diagram of the present disclosure establishing a corresponding matching relationship between a map and an optical image.

As shown in FIG. 3, the results of image correspondence between the present disclosure and three basic transformation models (i.e., similarity model, affine model, and perspective model) on the TENM-DS dataset are compared; there are 432 similar models with a root mean square error of 1.91, there are 367 affine models with a root mean square error of 1.83, there are 153 perspective models with a root mean square error of 1.65, there are 584 in the present disclosure with a root mean square error of 1.79. The experimental results show that the present disclosure can effectively fuse the advantages of multiple transformation models, which improves the accuracy and robustness of matching. As shown in FIGS. 4A and 4B, the present disclosure can establish corresponding matching relationships between an optical image and a depth image, as well as between a map and the optical image.

Embodiment 2

This embodiment has the same technical solution as the embodiment 1, except for the following technical solution.

This embodiment provides a multi-source image correspondence system based on heterogeneous model fitting, including: an image acquisition module, a log-Gabor filter construction module, a frequency domain conversion module, a multi-orientation phase consistency model construction module, an image feature information extraction module, a variable-size bin strategy construction module, a descriptor construction module, a normalization module, a target image acquisition module, an optimal geometric transformation model construction module, an initial matching pair construction module, a model hypothesis generation module, a minimum cost calculation module, a joint position offset transformation error construction module, and a matching output module.

In this embodiment, the image acquisition module is configured to obtain a two-dimensional image.

In this embodiment, the log-Gabor filter construction module is configured to construct a two-dimensional log-Gabor filter for the two-dimensional image.

In this embodiment, the frequency domain conversion module is configured to transform the two-dimensional log-Gabor filter from a frequency domain to a spatial domain based on a Fourier inverse transform.

In this embodiment, the multi-orientation phase consistency model construction module is configured to construct a multi-orientation phase consistency model, calculate an amplitude component and a phase component with respect to the scale and orientation, construct a phase consistency model based on the amplitude component and phase component, calculate phase consistency weighted moments in multiple orientations, and construct a multi-orientation phase consistency model based on phase consistency model and phase consistency weighted moments in multiple orientations.

In this embodiment, the image feature information extraction module is configured to extract image feature information from the multi-orientation phase consistency model by using the Shi-Tomasi operator, to filter out a feature point with a response value below a set threshold.

In this embodiment, the variable-size bin strategy construction module is configured to construct a variable-size bin strategy based on image feature information, the variable-size bin strategy divides a circular neighborhood of feature distribution into a plurality of sub-regions with different numbers according to different angle quantization rules, and different circular neighborhoods use gradient orientation histograms with different dimensions as a local descriptor.

In this embodiment, the descriptor construction module is configured to calculate the orientation histogram of each sub-region as a descriptor, and define a quantified orientation histogram for each feature point as a descriptor.

In this embodiment, the normalization module is configured to normalize a descriptor vector.

In this embodiment, the target image acquisition module is configured to take the two-dimensional image as a reference image to obtain a to-be-matched target image.

In this embodiment, the optimal geometric transformation model construction module is configured to construct an optimal geometric transformation model, and minimize feature information between the reference image and the target image.

In this embodiment, the initial matching construction module is configured to obtain the coordinates of two feature points from the reference image and the target image, respectively; and construct an initial matching pair.

In this embodiment, the model hypotheses generation module is configured to generate multiple model hypotheses for every two images based on the heterogeneous model, the model hypotheses are generated by randomly sampling multiple minimum subsets from feature points in the model hypotheses.

In this embodiment, the minimum cost calculation module is configured to calculate a transformation error of any two feature points in the reference image and target image with respect to the model hypotheses using Sampson distance, form an ascending permutation, select the least k-th-order statistic of a square transformation error as a minimum cost, k represents an acceptable size of a structure.

In this embodiment, the joint position offset transformation error construction module is configured to construct a joint position offset transformation error, which combines horizontal displacement, vertical displacement, and cosine similarity of descriptor vectors as a constraint criteria to extract more matching pairs; calculate offset of matching pairs in horizontal and vertical orientations as a position transformation error constraint feature descriptor, and construct a joint position offset transformation error.

In this embodiment, the matching output module is configured to accumulate matching pairs from different heterogeneous models that meet a preset joint position offset transformation error; retain only one matching pair when two matching pairs have the same feature points, output a final matching pair to complete multi-source image correspondence after an accumulation operation.

The above embodiments are preferred embodiments of the present disclosure, but the embodiments of the present disclosure are not limited by the above embodiments. Any other changes, modifications, substitutions, combinations, or simplifications that do not deviate from the spirit and principles of the present disclosure should be included in the protection scope of the present disclosure.

What is claimed is:

1. A multi-source image correspondence method based on heterogeneous model fitting, comprising the following steps:

obtaining a two-dimensional image, constructing a two-dimensional log-Gabor filter for the two-dimensional image, and it is represented as:

$$\mathcal{G}_{(\sigma,\mu)}(\rho, \delta) = \exp\left(\frac{(\rho - \rho_\sigma)^2}{-2\mathcal{B}_\rho^2}\right) \cdot \exp\left(\frac{(\delta - \delta_{(\sigma,\mu)})^2}{-2\mathcal{B}_\delta^2}\right)$$

wherein, $B_\rho$ and $B_\delta$ respectively represent bandwidths of the filter in orientation of pole diameter $\rho$ and polar angle $\delta$, $\sigma$ and $\mu$ represent scale and orientation of the two-dimensional log-Gabor filter G, $\rho_\sigma$ represents a center frequency of the filter, $\delta_{(\sigma,\mu)}$ represents angular frequency in a polar coordinate;

converting the two-dimensional log-Gabor filter from a frequency domain to a spatial domain based on Fourier inverse transform, and it is represented as:

$$\mathcal{G}_{(\sigma,\mu)}(x, y) = \mathcal{G}_{(\sigma,\mu)}^{eve}(\rho, \delta) + i \cdot \mathcal{G}_{(\sigma,\mu)}^{odd}(\rho, \delta)$$

wherein, $$\mathcal{G}_{(\sigma,\mu)}^{eve}(x, y)$$

and $$\mathcal{G}_{(\sigma,\mu)}^{odd}(x, y)$$

represent even-symmetric and odd-symmetric of the two-dimensional log-Gabor filter G, respectively; i represent imaginary unit;

calculating an amplitude component and a phase component with respect to the scale and orientation;

constructing a phase consistency model based on the amplitude component and phase component, calculating phase consistency weighted moments in multiple orientations, and constructing a multi-orientation phase consistency model based on phase consistency model and phase consistency weighted moments in multiple orientations, and it is represented as:

$$\mathbb{W}_\sigma = 0.5 \times (\mathbb{M}_\sigma + \mathcal{M}_\sigma + \varpi \times (\mathbb{M}_\sigma - \mathcal{M}_\sigma))$$

$$\begin{cases} \mathbb{M}_\sigma = \frac{1}{2}\left(\sum_\mu (\beta_\sigma)^2 + \sum_\mu (\alpha_\sigma)^2 + \sqrt{\left(2\sum_\mu (\alpha_\sigma)(\beta_\sigma)\right)^2 + \left(\sum_\mu (\alpha_\sigma)^2 - \sum_\mu (\beta_\sigma)^2\right)^2}\right), \\ \mathcal{M}_\sigma = \frac{1}{2}\left(\sum_\mu (\beta_\sigma)^2 + \sum_\mu (\alpha_\sigma)^2 - \sqrt{\left(2\sum_\mu (\alpha_\sigma)(\beta_\sigma)\right)^2 + \left(\sum_\mu (\alpha_\sigma)^2 - \sum_\mu (\beta_\sigma)^2\right)^2}\right), \end{cases}$$

$$\alpha_\sigma = \mathcal{PC}(x, y) \cdot \cos(\phi_{(\sigma,\mu)})$$

$$\beta_\sigma = \mathcal{PC}(x, y) \cdot \sin(\phi_{(\sigma,\mu)})$$

$$\mathcal{PC}(x, y) = \frac{\sum_\sigma \sum_\mu \omega_\sigma(x, y) \lfloor \mathbb{A}_{(\sigma,\mu)}(x, y) \Delta \mathbb{P}_{(\sigma,\mu)}(x, y) - \gamma \rfloor}{\sum_\sigma \sum_\mu \mathbb{A}_{(\sigma,\mu)}(x, y) + \epsilon}$$

$$\begin{cases} \mathbb{A}_{(\sigma,\mu)}(x, y) = (\varepsilon_{(\sigma,\mu)}(x, y)^2 + O_{(\sigma,\mu)}(x, y)^2)^{0.5} \\ \mathbb{P}_{(\sigma,\mu)}(x, y) = \arctan(O_{(\sigma,\mu)}(x, y)/\varepsilon_{(\sigma,\mu)}(x, y)), \end{cases}$$

$$\varepsilon_{(\sigma,\mu)}(x, y) = I(x, y) * \mathcal{G}_{(\sigma,\mu)}^{eve}(x, y)$$

$$O_{(\sigma,\mu)}(x, y) = I(x, y) * \mathcal{G}_{(\sigma,\mu)}^{odd}(x, y)$$

wherein, $\mathbb{A}_{(\sigma,\mu)}(x,y)$ represents the amplitude component, $\mathbb{P}_{(\sigma,\mu)}(x,y)$ represents the phase component, $\omega_\sigma(x,y)$ is a weight coefficient, $\lfloor \cdot \rfloor$ is a truncation function, $\Delta \mathbb{P}_{(\sigma,\mu)}(x,y)$ is phase deviation with respect to the scale $\sigma$ and orientation, $\mu$; $\gamma$ and $\epsilon$ are constant; $\mathbb{M}_\sigma$ and $\mathcal{M}_\sigma$ represent a maximum moment and a minimum moment corresponding to the scale $\sigma$; $\overline{\omega}$ represent a weighted moment coefficient of orientation, $\mathcal{PC}$ represent the phase consistency model; $W_\sigma$ represent the multi-orientation phase consistency model, I(x,y) represent the two-dimensional image, $G_{(\sigma,\mu)}^{eve}$(x,y) and $G_{(\sigma,\mu)}^{odd}$(x,y) represent the even-symmetric and odd-symmetric of the two-dimensional log-Gabor filter G, respectively;

extracting image feature information from the multi-orientation phase consistency model by using Shi-Tomasi operator, filtering out a feature point with a response value below a set threshold, constructing a variable-size bin strategy based on image feature information, the variable-size bin strategy divides a circular neighborhood of feature distribution into a plurality of sub-regions according to different angular quantization rules, and different circular neighborhoods use gradient orientation histograms with different dimensions as a local descriptor;

calculating the orientational histogram of each sub-region as a descriptor, defining a quantified orientation histogram for each feature point as a descriptor, and normalizing a descriptor vector;

taking the two-dimensional image as a reference image, obtaining a to-be-matched target image, constructing an optimal geometric transformation model, and minimizing feature information between the reference image and the target image;

obtaining coordinates of two feature points from the reference image and the target image respectively, and constructing an initial matching pair;

generating multiple model hypotheses for every two images based on the heterogeneous model, the model hypotheses are generated by randomly sampling multiple minimum subsets from feature points in the model hypotheses;

calculating a transformation error of any two feature points in the reference image and target image with respect to the model hypotheses with Sampson distance, forming an ascending permutation, selecting the least k-th-order statistic of a square transformation error as a minimum cost, k represents an acceptable size of a structure;

extracting more matching pairs by combining horizontal displacement, vertical displacement, and cosine similarity of descriptor vector as a constraint criteria, calculating the offset of matching pairs in horizontal and vertical orientations as a position transformation error constraint feature descriptor, and constructing a joint position offset transformation error;

accumulating matching pairs from different heterogeneous models that meet a preset joint position offset transformation error; retaining only one matching pair when two matching pairs have the same feature points; outputting a final matching pair to complete the multi-source image correspondence after an accumulation operation.

2. The multi-source image correspondence method based on heterogeneous model fitting as claimed in claim 1, wherein the calculating the orientational histogram of each sub-region as a descriptor and defining a quantified orientation histogram for each feature point as a descriptor are represented as:

$$\mathcal{D}_d = \{ \mathcal{R}(1,1) \cdot \mathcal{H}(1,1), \ldots, \mathcal{R}(h,l) \cdot \mathcal{H}(h,q), \ldots, \mathcal{R}(n,k) \cdot \mathcal{H}(n,m) \}, \forall h \in \{1, \ldots, n\}, \forall q \in \{1, \ldots, m\}, \forall l \in \{1, \ldots, k\}$$

wherein, $\mathcal{R}(h,l)$ represents a sub-region of a $q^{th}$ radial quantization and $i^{th}$ angular quantization; $\mathcal{H}(h,q)$ represents an orientation histogram that is quantized of the $q^{th}$ histogram in $h^{th}$ radial quantization; n is the number of radial quantization; m is the number of histogram quantization; κ is the number of angular quantization; dimension of each descriptor is described as $$d = \sum_{h=1}^{n} m_h \cdot k_h.$$

3. The multi-source image correspondence method based on heterogeneous model fitting as claimed in claim 1, wherein the calculating a transformation error of any two feature points in the reference image and target image with respect to the model hypotheses with Sampson distance and forming an ascending permutation are represented as:

$$\lambda_i^{(v)} = [\lambda_{i,1}^{(v)}, \lambda_{i,2}^{(v)}, \ldots, \lambda_{i,M}^{(v)}]$$

which satisfies $\tau_{\theta_i^{(v)}, \lambda_{i,1}^{(v)}} \leq \ldots \leq \tau_{\theta_i^{(v)}, \lambda_{i,M}^{(v)}}$, $\lambda_i^{(v)}$ represents preference of feature points with respect to, $\tau_{\theta_i^{(v)}}$ represents the transformation error of any two feature points with respect to the model hypotheses, $s_i$ and $s'_i$ respectively represent coordinates of two feature points from the reference image and the target image.

4. The multi-source image correspondence method based on heterogeneous model fitting as claimed in claim 1, wherein the selecting the least k-th-order statistic of a square transformation error as a minimum cost is represented as:

$$C(\theta^{(v)}) = \sum_{j=k-p+1}^{k} \lambda_j^{2(v)}$$

wherein, $\lambda_j^{2(v)}$ denotes a $j^{th}$ sorted squared transformation error, and ρ represents the size of multiple minimum subsets that is randomly sampled.

5. The multi-source image correspondence method based on heterogeneous model fitting as claimed in claim 1, wherein a constructed joint position offset transformation error is represented as:

$$\mathcal{J}^{(v)}(s_i, s'_j) = (1 + \mathbb{E}^{(v)}(s_i, s'_j)) \cdot \mathbb{D}(s_i, s'_j)$$

wherein, $s_i$ and $s'_j$ represent feature points in two heterogeneous images, respectively; subscripts i and j represent indexes of feature points in the image, $\mathbb{D}(s_i, s'_j)$ denotes inverse cosine similarity of descriptors corresponding to $s_i$ and $s'_j$, $\mathbb{E}^{(v)}(s_i, s'_j) = \|s_i - \tau_{\theta_i^{(v)}}(s_i, s'_j)\|$ represent a positional transformation error between matching pair $(s_i, s'_j)$, and $\tau_{\theta_i^{(v)}}$ represent the transformation error of any two feature points relative to the model hypotheses.

6. The multi-source image correspondence method based on heterogeneous model fitting as claimed in claim 1, wherein the accumulating matching pairs from different heterogeneous models with a small joint position offset transformation error is represented as:

$$S^* = \mathcal{F}\left( \sum_{v \in \mathcal{V}} \tilde{S}^{(v)} \right)$$

wherein, $\mathcal{F}(\cdot)$ represents removing duplicates by traversing all candidate matching pairs, $\tilde{S}^{(v)}$ represents a candidate matching pair defined by the joint position offset transformation error, $$\sum_{v \in \mathcal{V}}$$

represents an accumulating operation performed on each heterogeneous model, and v represents the heterogeneous model.

* * * * *